United States Patent
Crooks

(10) Patent No.: US 11,113,683 B2
(45) Date of Patent: Sep. 7, 2021

(54) DISPLACED SCANNER STATUS INDICATOR

(71) Applicant: NCR Corporation, Duluth, GA (US)

(72) Inventor: John Crooks, Duluth, GA (US)

(73) Assignee: NCR Corporation, Atlanta, GA (US)

(*) Notice: Subject to any disclaimer, the term of this patent is extended or adjusted under 35 U.S.C. 154(b) by 293 days.

(21) Appl. No.: 15/834,701

(22) Filed: Dec. 7, 2017

(65) Prior Publication Data

US 2019/0180264 A1 Jun. 13, 2019

(51) Int. Cl.
| | |
|---|---|
| *G06Q 20/20* | (2012.01) |
| *H04N 7/18* | (2006.01) |
| *G06K 7/14* | (2006.01) |
| *G07G 1/00* | (2006.01) |
| *G06K 7/10* | (2006.01) |
| *G07G 3/00* | (2006.01) |

(52) U.S. Cl.
CPC ....... *G06Q 20/208* (2013.01); *G06K 7/10821* (2013.01); *G06K 7/1413* (2013.01); *G07G 1/0063* (2013.01); *G07G 3/003* (2013.01); *H04N 7/183* (2013.01); *H04N 7/185* (2013.01)

(58) Field of Classification Search
CPC ............. G06K 7/10821; G06K 7/1413; G06Q 20/208; G07G 1/0063; G07G 3/003; H04N 7/183; H04N 7/185
See application file for complete search history.

(56) References Cited

U.S. PATENT DOCUMENTS

| | | | | |
|---|---|---|---|---|
| 7,010,501 | B1* | 3/2006 | Roslak | G06Q 20/20 705/23 |
| 8,068,154 | B2* | 11/2011 | Jacob | H04N 5/3456 348/294 |
| 8,185,404 | B1* | 5/2012 | McDaniel | G07D 11/34 705/1.1 |
| 8,313,033 | B1* | 11/2012 | Vinogradov | G06K 7/10831 235/470 |
| 8,727,218 | B1* | 5/2014 | Handshaw | G06K 7/1096 235/440 |
| 8,831,970 | B2* | 9/2014 | Weik, III | E06B 9/70 705/13 |
| 8,944,322 | B2* | 2/2015 | White | G06K 7/1096 235/383 |
| 9,589,439 | B2* | 3/2017 | Golden | B60R 25/018 |
| 2004/0238637 | A1* | 12/2004 | Russell | G06K 7/10 235/462.14 |
| 2006/0080177 | A1* | 4/2006 | Walter | G06Q 20/208 705/23 |
| 2011/0147454 | A1* | 6/2011 | Matsuhisa | G06K 7/10821 235/383 |

(Continued)

*Primary Examiner* — Peter Ludwig
*Assistant Examiner* — Michael Jared Walker
(74) *Attorney, Agent, or Firm* — Schwegman, Lundberg & Woessner

(57) ABSTRACT

A scanner is integrated as a peripheral device into a POS terminal. Light Emitting Diodes (LEDs) are selectively activated and deactivated during item scanning for items being processed during a transaction at the POS terminal. The activation and deactivation of the LEDs are visible to an overhead security camera during the transaction. The selective activation and deactivation providing indications during the transaction as to whether the items are successfully scanned or unsuccessfully scanned during the transaction as the items are passed in front of at least one scan window of the scanner.

11 Claims, 6 Drawing Sheets

(56) References Cited

U.S. PATENT DOCUMENTS

| | | | |
|---|---|---|---|
| 2012/0187191 A1* | 7/2012 | Olmstead | G06K 7/10732 |
| | | | 235/462.13 |
| 2015/0060552 A1* | 3/2015 | Rambler | G06K 7/10574 |
| | | | 235/470 |
| 2016/0148030 A1* | 5/2016 | Detwiler | G06K 7/1439 |
| | | | 235/470 |
| 2016/0283565 A1* | 9/2016 | Taylor | G06F 16/248 |
| 2017/0017941 A1* | 1/2017 | Takahashi | G06Q 20/20 |

\* cited by examiner

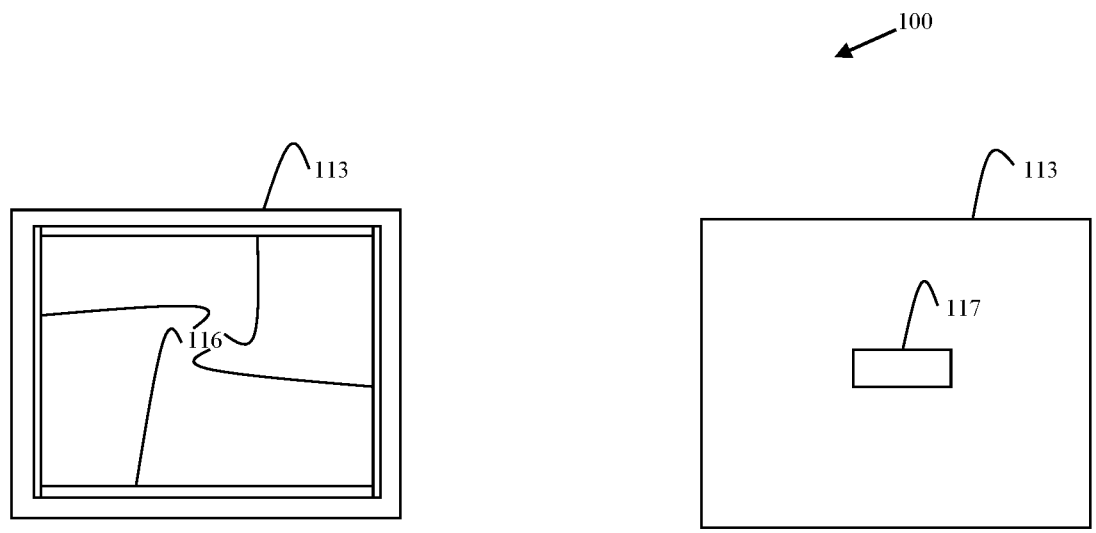
FIG. 1B
FIG. 1C
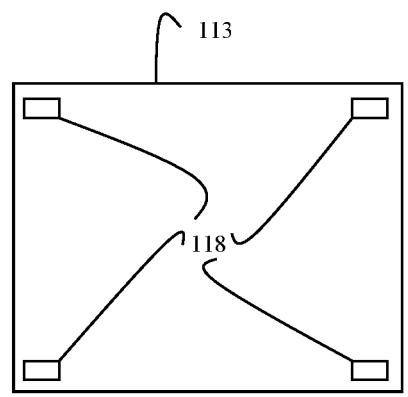
FIG. 1D

DISPLACED SCANNER STATUS INDICATOR

BACKGROUND

Security during checkout is a significant concern in the retail industry. Typically, checkouts involve a cashier checking out a customer or a customer performing a self-checkout without any cashier assistance. Items purchases are scanned at a checkout terminal during checkout.

At least two security issues can arise during checkouts. First, a customer (during a self-checkout) may intentionally or unintentionally not scan an item or scan a lower-priced item instead of a true item. Second, cashiers may intentionally or unintentionally miss scanning an item or scan a lower-priced item instead of a correct item. When a cashier intentionally does not scan an item during an assisted checkout, this is referred to as sweet hearting, which is a transaction where the cashier is allowing a friend or relative to avoid paying for an item during checkout.

Stores have installed security cameras and other security mechanisms in an attempt to mitigate losses experienced with intentional and unintentional miss-scanning of items during checkouts. One popular approach is to have the scanner activate status lights when an item passing in front of the scanner but does not scan during a transaction. An overhead security camera can be time and date synchronized with transactions and detect when items are not scanned properly during a transaction based on the activation or deactivation of the scanner lights.

Unfortunately, the configuration of the scanner into the checkout terminals usually obstructs the overhead camera's view of the scanner status lights during a transaction, such that the images taken by the camera provide no indication of the status lights. The checkout displays overhang and cover the area where the status lights are activated or deactivated.

Furthermore, because a scanner activates light banks during a scan of an item (for barcode illumination prior to imaging an item), the integration of the status lights into the scan plate of the scanner has been largely not attempted or unsuccessfully attempted, since the status lights when illuminated can interfere with the scan imaging process of item barcodes during checkout causing scanning errors.

SUMMARY

In various embodiments, methods, a system, and a scanner for providing a displaced scanner status indicator during a checkout are presented for improved checkout security.

According to an embodiment, a method for providing a displaced scanner status indicator is presented. Specifically, in one embodiment, a scanner detects an item passing by a scan window of the scanner during a transaction. A determination is made as to whether the item was identified by the scanner for processing with the transaction. At least one light within a field-of-view of an overhead security camera is selectively activated or deactivated as an indication for the determination.

BRIEF DESCRIPTION OF THE DRAWINGS

FIG. 1B is a diagram of a first configuration for a scanner status indicator into a scan plate of a scanner, according to an example embodiment.

FIG. 1C is a diagram of a second configuration for a scanner status indicator into a scan plate of a scanner, according to an example embodiment.

FIG. 1D is a diagram of a third configuration for a scanner status indicator into a scan plate of a scanner, according to an example embodiment.

DETAILED DESCRIPTION

Figure 1A:
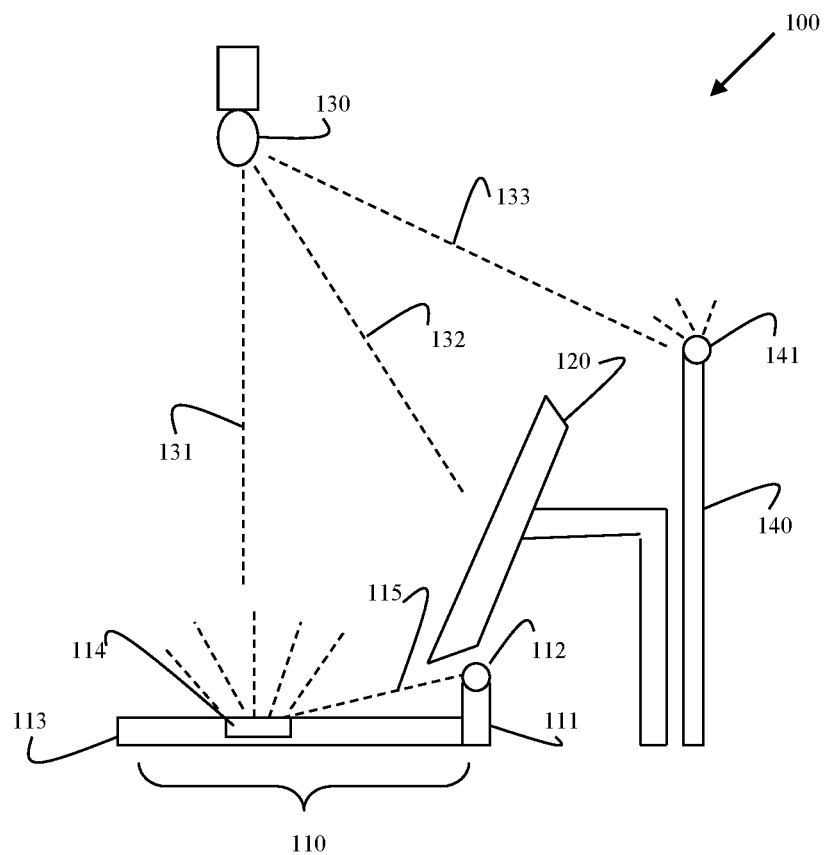
FIG. 1A is a diagram of a system for providing displaced scanner status indicators, according to an example embodiment.

FIG. 1A is a diagram of a system 100 for providing displaced scanner status indicators, according to an example embodiment. It is to be noted that the components are shown schematically in greatly simplified form, with only those components relevant to understanding of the embodiments being illustrated.

Furthermore, the various components (that are identified in the FIGS. 1A-1E) are illustrated and the arrangement of the components is presented for purposes of illustration only. It is to be noted that other arrangements with more or less components are possible without departing from the teachings of providing displaced scanner status indicators, presented herein and below.

The system 100 includes a bioptic scanner 110, a POS display 120, an overhead security camera 130, and, optionally, a checkout station status pole 140. The scanner 110 includes a vertical scan window 111 with an optional Light Emitting Diode(s) (LED) 112 providing a scanner status indicator. The scanner 110 also includes a horizontal scan window 113 with an optional LED 114 providing a scanner status indicator.

The overhead camera 130 includes a field-of-view 131, 132, and 133, so that the camera 130 can capture images from the horizontal window 113, the display 120, and, optionally, LED lights 141 situated on a top of the checkout station status pole 140.

It is to be noted that the status pole 140 can be physically situated in other configurations from that which is illustrated in the FIG. 1A and that all that is necessary is that the LED(s) 141 are within a field of view (such as field-of-view 133) of the camera 130 during a checkout. The status pole 140 is also an optional arrangement and embodiment presented herein with system 100.

It is important for overhead security camera 130 to clearly see (have a field-of-view 131) to the scan indicator 114 and/or 141, so that store security personnel know when items are successfully scanned by the scanner 110. This is necessary to detect "sweet hearting" in assisted lanes, where the cashier pretends but does not really scan items, so they can give items away to their friends and/or relatives. This is also necessary to detect theft in self-checkout lanes, where customers similarly pretend but do not really scan items before placing the items in the self-checkout bagging area. If there is no security scale, the self-checkout system will not detect this type of theft. If there is a security scale, chances are good that a busy remote management terminal attendant for the Self-Service Terminals (SSTs) will clear the resulting "unexpected item in bagging area" exception without detecting the theft because this occurs with such regularity in SST configurations.

As discussed more completely herein and below, the scan indicator LED (112, 114, and/or 141) is displaced out to the horizontal top plate 113 (horizontal scan window 113) or, in an alternative embodiment for self-checkout applications, to the status pole 140 (through LEDs 141). This allows overhead security cameras 130 to see when items are successfully scanned during checkouts (assisted and self-service).

The various arrangements and processing presented herein can include: a scan indicator LED 114 on the horizontal top late 113 in a number of configurations including the scan indicator LED 114 provided in: 1) an existing horizontal top plate window 114 (shown in the FIG. 1A), 2) around the edges 116 of the horizontal top plate 113 (shown in the FIG. 1B), 3) in dedicated windows 117 of the horizontal top plate 113 separate from the existing windows of the horizontal top plate 113, 4) a scan indicator LED 115 beamed down from the vertical scan tower 111 using LED(s) 112 and optical lenses to the horizontal top plate 113, and/or 5) a scan indicator LED 141 on a top of a status pole 140. The LED status indicator (112, 114, 116, 117, 118, and/or 141) pulses off to indicate that a successful scan of an item was processed by the scanner 110. The timing of LED activation for scanner 110 operation and the scan indicator LED 114 in (1) includes a coordinated duty cycling from scan indicator LED 114 activation and scanner LED illumination to avoid reducing scan performance of the scanner 110. Furthermore, the patterns of different color LEDs and sequences of illumination are enhanced to improve existing security of security systems that use the images provided by the scanner 130 and details provided by the checkout station during checkouts (assisted or self-service (SS)).

In an embodiment, the scan indicator LED(s) 114 is displaced to the horizontal top plate (FIG. 1A and (1) discussed above). Here, the scan indicator LED 114 is visible through the scanner top plate window 113. Multicolored LEDs 114 (red, green, blue (RGB), or any combination) are added to the top plate window 113 to shine through the top plate horizontal window 113 to indicate scanner status. The scan indicator 114 can be on all the time or the indicator 114 can flash momentarily when a barcode is scanned for enhanced visibility. Optionally, to ensure the multicolored LEDs 114 are visible to the overhead security camera 130, and to ensure that the LEDS 114 do not interfere (create noise) with the white LEDs of the scanner (can also be red LEDs), which are used to illuminate barcodes for scanning, the scanner 110 turns on the scan indicator LEDs 114 during the "off" period between white/red light (LED) illumination pulses. It is to be noted that because of the close proximity between the scan indicator 114 and the horizontal scan window 113, the scan indicator 114 can reduce horizontal window scan performance by over-exposing the scanner camera 130. It can also shift the white light illumination color spectrum, which reduces security system's color-metric performance. The white light illumination in an imaging scanner pulses on and off with an approximately a 2% duty cycle at 40 Hz frequency. Without this pulsing, the white light illumination would be uncomfortable for users due to the extreme brightness of the white light LEDs. The internal scanner cameras only capture images (expose) during the short time when the white light illumination is on. Further, to control costs, and in some embodiments, the multicolored scan indicator LEDs 114 are not as bright as the white light illumination LEDs used by the scanner 110 for scanning. However, the multicolored LEDs 114 can be on for 98% of time (100%−2%=98%) that the white light illumination is off. This 98% duty cycle allows these LEDs 114 to appear brighter to observers and overhead security cameras 130, despite the fact that they are actually not as bright as the white light illumination used by the scanner 110.

In an embodiment, as shown in the FIG. 1B, multicolored LEDs 116 are integrated around the edges of the scanner top plate 113 (discussed in (2) above). A ring of scan indicator LEDs 116 under the perimeter of the top plate 113 shine through the gap between the scanner top plate 113 and the checkout counter.

In an embodiment, as shown in the FIGS. 1C and 1D, multicolored LEDs 117 and/or 118 are integrated in their own independent windows (can be more than 1 that as illustrated in the FIG. 1C—discussed in (3) above). This is similar to the approach discussed with (1); however, instead of shining through the horizontal window 113, the scan indicator 117/118 shines through dedicated translucent plastic windows or slots on the top plate 113.

In an embodiment, as shown in the FIG. 1A and as discussed with (4) above, multicolored LEDs 112 are beamed down 115 from the vertical scan tower 111 to reflect off the top plate 113. The Multicolored LEDs 112 are mounted on the scanner vertical tower 111 and arranged to shine their light on the horizontal top plate 113. This arrangement deploys optical lenses and/or parabolic reflectors behind the LEDs 112 to ensure the light is focused and visible on the top plate 113. Optionally, this embodiment also benefits from the coordinated scan indicator/scanner illumination discussed with (1) above.

In an embodiment, the status indicator 114 is illuminated selectively using white LEDs (sometimes red LEDs) through the top plate window 113. So, instead of adding multicolored LEDs to indicate when a scan occurs, the scanner 110 can instead turn off its white (or red) illumination for a relatively long period of time, for example ½ second, such that the interruption is clearly visible to the user and to overhead security cameras 130. This embodiment does not show the scanner status (such as, green enabled, red disabled, etc.), and makes the scanner 110 "blind" to subsequent barcode scans during the period when the illumination is off. However, this embodiment does not increase hardware cost, and is clearly visible to overhead security cameras 130.

In an embodiment for self-checkout applications (SSTs) as discussed in (5) above and shown as an optional feature in the FIG. 1A, the SST shows the scan status LED(s) 141 on the SST status pole 140. The SST checkout software is modified to blink the LEDs 141 whenever a barcode is scanned by the scanner 110. Optionally, an added LED 141 on top of the pole 140 indicates scan status without disturbing any existing LEDs of the pole 140. This added LED is visible to the overhead security cameras 130, but not visible to customers. Specifically, and in an embodiment, the scanner 110 scans an item and sends a message to the SST transaction manager processing on the PC core of the SST. The message flows from the scanner 110 as a scanner service object to the SST transaction manager application. The SST transaction manager instructs the LEDs 141 to turn off for ½ second, then turn back on. Here, the message flows from the SST transaction manager as a LED control service object to the LED 141. Alternatively, the message can bypass the SST transaction manager and flow from the scanner 110 directly to the LED(s) 141. For example, scanner-generated service object translated on the scanner 110 as a LED service object delivered to the LED 141. Here, the scanner 110 may have a peripheral connection to the LED 141.

In an embodiment, the horizontal plane scan indicator lights (LEDs) 114 and/or 116-118 replace any existing scan indicator lights on any existing vertical scan tower, but they can also be in addition to existing scan indicator lights. That is, the conventional scan status indicator LED is located on the top of the vertical scan tower and with embodiments presented herein (such as was discussed with (1)-(3) and (5) these LEDs can be removed from the vertical tower 111) or they can remain and be combined with the optical lenses to provide embodiment (4) discussed above.

As used herein, "multicolor lights or multicolored LEDs" includes dedicated green LEDs to indicate successful scan, or multicolor RGB LEDs that can combine to create a rainbow of colors for different customized status indications.

As used herein, a POS system refers to any customer-assisted terminal or SST providing checkout services at a retailer.

In an embodiment, the SST is an Automated Teller Machine (ATM). In an embodiment, the SST is a customer-operated kiosk.

In an embodiment, the sequence of color illuminations and pulsing of LED illuminations can be customized for the displayed status indicators 112, 114, and/or 116-118 for a security system that processes images from the camera 130. For example, a successful scan can cause a green flash. But a customer trying to steal a bottle of liquor by pretending it is bananas sold by weight can cause a red flash. This makes it convenient for security personnel to synchronize camera footage with POS security logs in situations where the security camera system and POS system are not tightly integrated with each other.

Figure 1E:
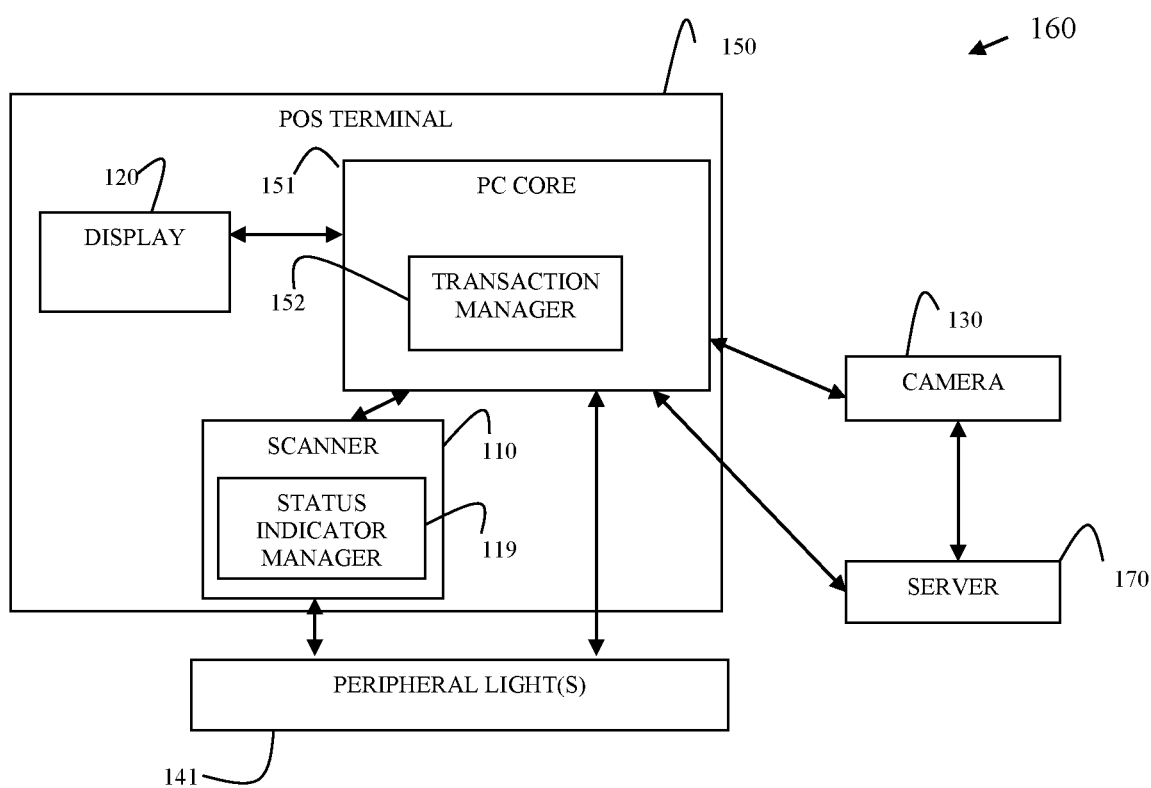
FIG. 1E is a diagram for a Point-Of-Sale (POS) system providing displaced scanner status indicators, according to an example embodiment.

FIG. 1E is a diagram for a Point-Of-Sale (POS) system 160 providing displaced scanner status indicators, according to an example embodiment. The system 160 is again shown in greatly simplified form with only those components of the system necessary for understanding the various embodiments presented herein illustrated.

The system 160 includes a POS terminal 150 that includes: a Personal Computing (PC) core 151 having one or more hardware processors, memory, and non-transitory computer-readable media. The PC core 151 executes on the hard processors a set of executable instructions programmed in the memory and/or media as a transaction manager 152. The POS terminal 150 also includes an integrated peripheral display 120 and an integrated peripheral scanner 110. The scanner 110 includes one or more hardware processors, memory, and non-transitory computer-readable media. The scanner 110 executes on the hard processors a set of executable instructions programmed in the memory and/or media as a status indicator manager 152. The POS terminal 150 includes network and/or interface connections to: a server 170 and optionally, to a camera 130, and one or more peripheral lights 141.

The system 160 implements the various displayed status indicator embodiments presented above with the FIGS. 1A-1D. The status indicator manager 119 selectively activates and/or deactivates the status indicator LEDs (lights) 112, 114, and/or 116-118 of the scanner's horizontal top plate 114, the vertical tower 111, and/or the peripheral light 141 while items are passed in front of the scanner for processing during a checkout at the POS terminal 150. This is done in the manners discussed above with the noted embodiments of (1)-(5). The server 170 provides transaction information for item lookup during the transaction to the transaction manager 152. The server 170 also processes or is interfaced to one or more security systems for processing transaction information and images captured by the camera 130. The camera 130 is situated in a location to capture, in its field-of-view (131-133), images during the transaction associated with the selective illuminations or lack thereof performed by the status indicator manager 119 during the checkout.

In an embodiment, the POS terminal 150 is a cashier-operated terminal during the transaction.

In an embodiment, the POS terminal 150 is a SST that is operated by a customer during a SS transaction.

These and other embodiments will now be discussed with reference to the FIGS. 2-4.

Figure 2:
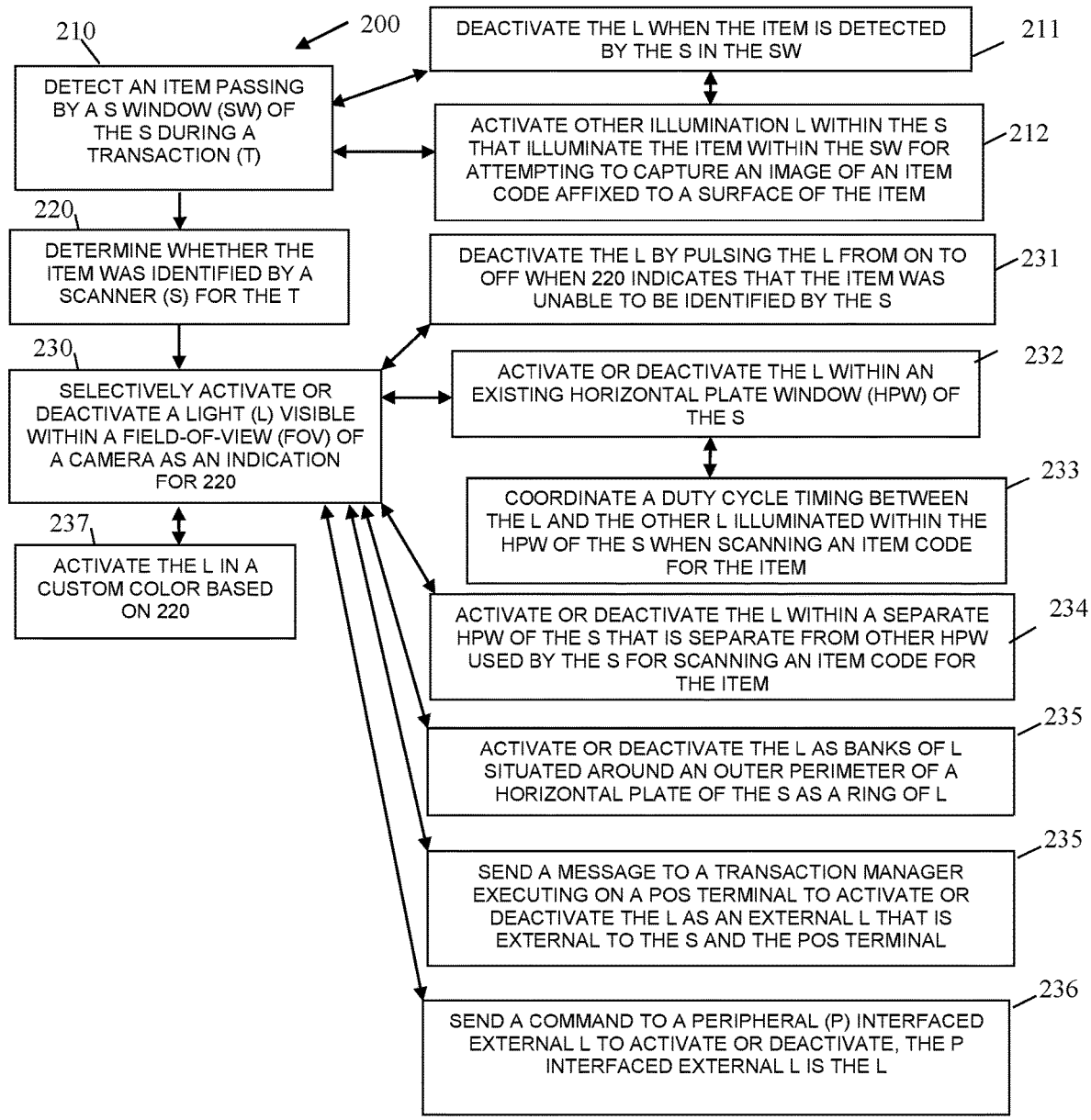
FIG. 2 is a diagram of a method for providing displaced scanner status indicators, according to an example embodiment.

FIG. 2 is a diagram of a method 200 for providing displaced scanner status indicators, according to an example embodiment. The software module(s) that implements the method 200 is referred to as a "scanner status manager." The scanner status manager is implemented as executable instructions programmed and residing within memory and/or a non-transitory computer-readable (processor-readable) storage medium and executed by one or more processors of a scanner. The processor(s) of the scanner that executes the scanner status manager are specifically configured and programmed to process the scanner status manager. The scanner status manager may or may not have access to one or more network connections during its processing. The network connections can be wired, wireless, or a combination of wired and wireless. In an embodiment, the scanner status manager does not require or does not have any network connectivity during its processing.

In an embodiment, the scanner that executes the scanner status manager is the scanner 110.

In an embodiment, the scanner is integrated as a peripheral device into the POS terminal 150. In an embodiment, the POS terminal 150 is a SST. In an embodiment, the POS terminal 150 is a cashier-operated terminal.

In an embodiment, the scanner status manager performs the selective activation and deactivation of any of, all or, or some combination of the status indicator LEDs 112, 114, 116, 117, and/or 118.

In an embodiment, the scanner status manager is the status indicator manager 119.

At 210, the scanner status manager detects an item passing by a scan window of the scanner during a transaction at a POS terminal.

In an embodiment, at 211, the scanner status manager deactivates the light when the item is detected by the scanner in the scan window.

In an embodiment, at 212, the scanner status manager activates other illumination lights within the scanner that illuminate the item within the scan window for attempting to capture an image of an item code affixed to a surface of the item.

The processing at 211 and 212 were discussed above with option (1) in the context of the embodiments presented in the FIGS. 1A-1E. This processing is done to mitigate any scanning failures due to the light for that status indicator being in a same scan window as the scanner's illumination lights.

At 220, the scanner status manager determines whether the item was identified by the scanner for the transaction. That is, either the scanner was able to read an item code or the scanner was not able to read the item code affixed to a surface of the item.

At 230, the scanner status manager selectively activates or deactivates a light visible within a field-of-view of a camera as an indication of the determination made at 220.

In an embodiment, at 231, the scanner status manager deactivates the light by pulsing the light from on to off when the determination made at 220 indicates that the item was unable to be identified by the scanner. In this embodiment, the light turns off momentarily for an unsuccessful scan and remains on otherwise, except for any duty cycling as discussed in the embodiments of 211 and 212.

In an embodiment, at 232, the scanner status manager activates or deactivates the light within an existing horizontal plate window of the scanner, such as horizontal plate member 113 of the FIGS. 1A-1D.

In an embodiment of 232 and at 233, the scanner status manager coordinates a duty cycle timing between the light and other lights illuminated within the horizontal plate window of the scanner when scanning an item code from the item. Again, this was discussed in embodiment (1) of the FIGS. 1A-1E and the processing at 211 and 212.

In an embodiment, at 234, the scanner status manager activates or deactivates the light within a separate horizontal plate window of the scanner that is separate and independent from other horizontal plate windows used by the scanner for scanning an item code for the item. This was discussed with the FIGS. 1C and 1D above.

In an embodiment, at 235, the scanner status manager activates or deactivates the light as banks of lights situated around an outer perimeter of a horizontal plate of the scanner as a ring of lights. This was discussed with the FIG. 1B above.

In an embodiment, at 236, the scanner status manager sends a command to a peripheral interfaced external light to activate or deactivate. The peripheral interfaced light is the light. This was discussed as embodiment (5) and presented as an option in the FIG. 1A above.

According to an embodiment, at 237, the scanner status manager activates the light in a custom color based on the determination made at 220. For example, green indicates a successful scan whereas red indicates an unsuccessful scan.

Figure 3:
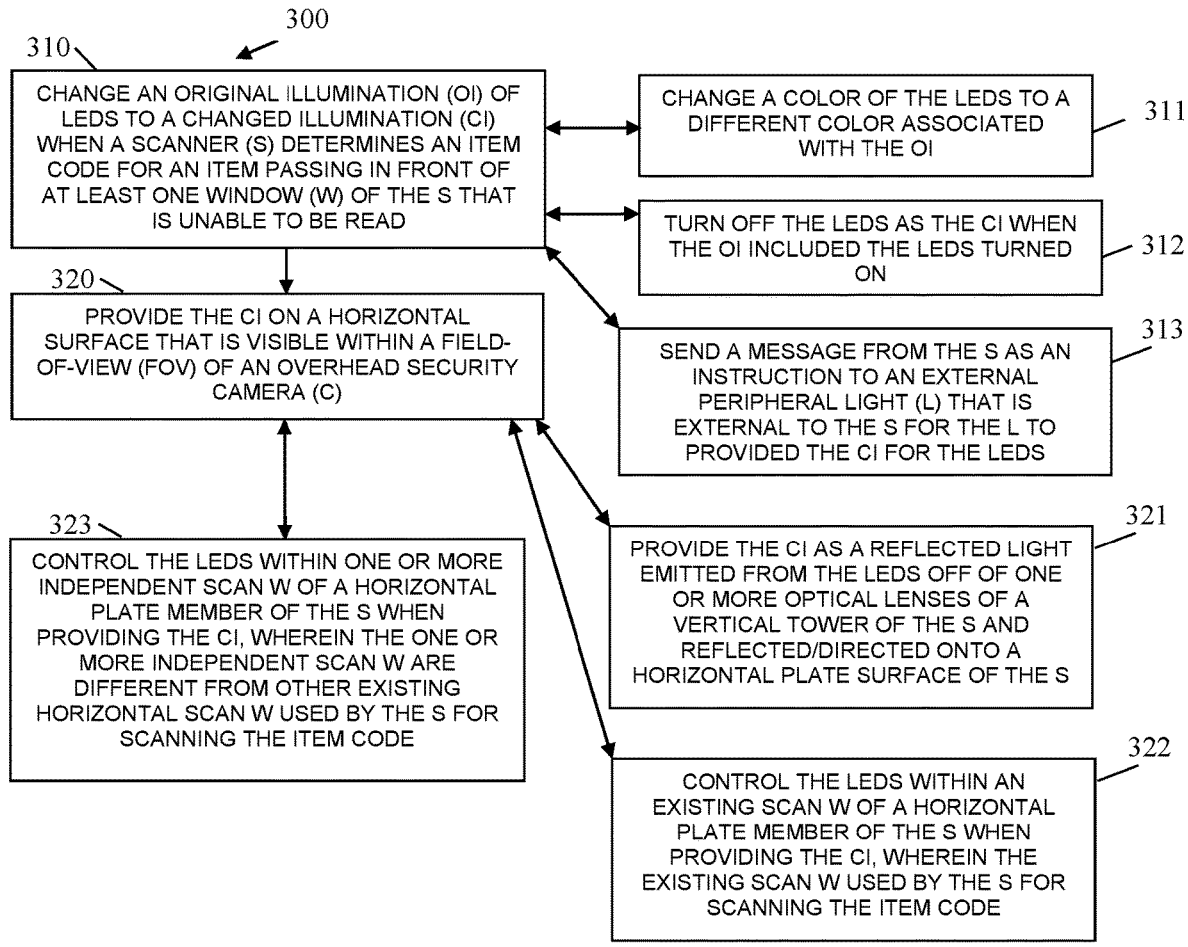
FIG. 3 is a diagram of another method for providing displaced scanner status indicators, according to an example embodiment.

FIG. 3 is a diagram of another method 300 for providing displaced scanner status indicators, according to an example embodiment. The software module(s) that implements the method 300 is referred to as a "displaced scanner indicator manager." The displaced scanner indicator manager is implemented as executable instructions programmed and residing within memory and/or a non-transitory computer-readable (processor-readable) storage medium and executed by one or more processors of a scanner. The processor(s) of the scanner that executes the displaced scanner indicator manager are specifically configured and programmed to process the displaced scanner indicator manager. The displaced scanner indicator manager may or may not have access to one or more network connections during its processing. The network connections can be wired, wireless, or a combination of wired and wireless. In an embodiment, the displaced scanner indicator manager does not require or does not have any network connectivity during its processing.

In an embodiment, the scanner that executes the displaced scanner indicator manager is the scanner 110.

In an embodiment, the scanner is integrated as a peripheral device into the POS terminal 150. In an embodiment, the POS terminal 150 is a SST. In an embodiment, the POS terminal 150 is a cashier-operated terminal.

In an embodiment, the displaced scanner indicator manager performs the selective activation and deactivation of any of, all or, or some combination of the status indicator LEDs 112, 114, 116, 117, and/or 118.

In an embodiment, the scanner status manager is the status indicator manager 119.

In an embodiment, the displaced scanner indicator manager is another and in some ways enhanced version of the method 200.

At 310, the displaced scanner indicator manager changes an original illumination of LEDs to a changed illumination when a scanner determines an item code for an item passing in front of at least one window of the scanner that is unable to be read or recognized by the scanner.

In an embodiment, at 311, the displaced scanner indicator manager changes a color of the LEDs to a different color associated with the original illumination.

In an embodiment, at 312, the displaced scanner indicator manager turns off the LEDs as the changed illumination when the original illumination included the LEDS turned on.

In an embodiment, at 313, the displaced scanner indicator manager sends a message from the scanner as an instruction to an external peripheral light that is external to the scanner for the external peripheral light to provide the changed illumination for the LEDs. Here, the LEDs are in the external peripheral light, such as LEDs 141.

At 320, the displaced scanner indicator manager provides the changed illumination on a horizontal surface that is visible within a field-of-view of an overhead security camera.

According to an embodiment, at 321, the displaced scanner indicator manager provides the changed illumination as a reflected light emitted from the LEDs off of one or more optical lenses of a vertical tower of the scanner and reflected/directed onto a horizontal plate surface of the scanner (e.g., vertical tower 111 and LEDs 112 of the FIG. 1A for scanner 110 directed onto horizontal plate surface 113).

In an embodiment, at 322, the displaced scanner indicator manager controls the LEDS within an existing scan window of a horizontal plate member of the scanner when providing the changed illumination. The existing scan window used by the scanner for scanning the item code from the item.

In an embodiment, at 323, the displaced scanner indicator manager controls the LEDs within one or more independent scan windows of a horizontal plate member of the scanner when providing the changed illumination. The one or more independent scan windows are different from other existing horizontal scan windows used by the scanner for scanning the item code from the item.

Figure 4:
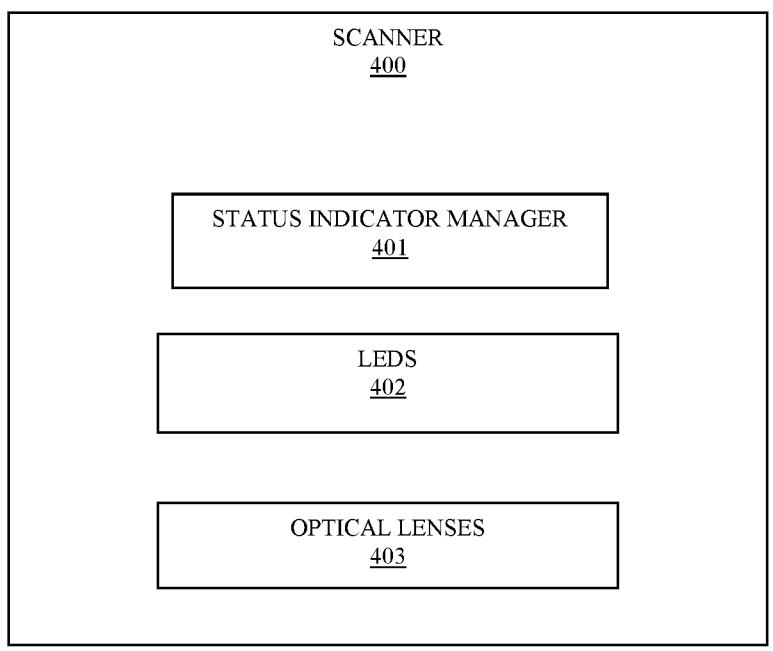
FIG. 4 is a diagram of a scanner that provides displaced scanner status indicators, according to an example embodiment.

FIG. 4 is a diagram of a scanner 400 that provides displaced scanner status indicators, according to an example embodiment. The scanner 400 includes a variety of hardware components and software components. The software components of the scanner 400 are programmed and reside within memory and/or a non-transitory computer-readable medium and execute on one or more processors of the scanner 400. The scanner 400 may communicate over one or more networks, which can be wired, wireless, or a combination of wired and wireless. In an embodiment, the scanner 400 includes no network connection or is without a network connection.

In an embodiment, the scanner 400 is the scanner 110.

In an embodiment, the scanner 400 is the scanner that executes the method 200.

In an embodiment, the scanner 400 is the scanner that executes the method 300.

In an embodiment, the scanner 400 is integrated as a peripheral device into the POS terminal 150. In an embodiment, the POS terminal 150 is a cashier-assisted terminal. In an embodiment, the POS terminal is a SST.

The scanner 400 includes a status indicator manager 402, LEDs 402, and, optionally, one or more optical lenses 403.

The status indicator manager 402 is configured to: 1) execute on one or more processors of the scanner, 2) selectively activate and deactivate the LEDs based on whether an item code for an item is recognized by the scanner, and 3) ensure that the LEDs when selectively activated or deactivated are visible within a field-of-view of an overhead security camera.

In an embodiment, the scanner 400 further includes one or more optical lenses 403 situated in a vertical tower member of the scanner 400 that directs any illumination of the LEDs from the vertical tower member onto a horizontal surface of a horizontal member of the scanner 400.

In an embodiment, the scanner 400 is a biotic scanner having a vertical member for vertical scanning and a horizontal member for horizontal scanning.

In an embodiment, the status indicator manager 402 performs the selective activation and deactivation of the LED indicators 112, 114, 116-118, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting, by a scanner, an item passing by a scan window of the scanner during a transaction;
   determining, by the scanner, whether the item was identified by the scanner for processing with the transaction; and
   selectively activating or deactivating, by the scanner, at least one light visible within a field-of-view of an overhead security camera as an indication for the determining, where the at least one light visible within the field-of-view of the overhead security camera is situated on a terminal status pole associated with a terminal performing the transaction and having a scanner, wherein the scanner comprises a peripheral connection to the at least one light visible within the field-of-view of the overhead security camera and the scanner controls the at least one light during the transaction, wherein the at least one light when illuminated is visible to the overhead security camera but not visible to customers from the terminal status pole, wherein the at least one light when illuminated does not interfere with existing lights associated with the terminal status pole and the existing lights are visible to the customers from the terminal status pole.

2. The method of claim 1, wherein detecting further includes deactivating the at least one light when the item is detected by the scanner in the scan window.

3. The method of claim 2, wherein deactivating further includes activating other illumination lights within the scanner that illuminate the item within the scan window for attempting to capture an image of an item code affixed to a surface of the item.

4. The method of claim 1, wherein selectively activating or deactivating further includes deactivating the at least one light by pulsing the at least one light from on to off when the determining indicates that the item was unable to be identified by the scanner.

5. The method of claim 1, wherein selectively activating or deactivating further includes sending a command to a peripheral interfaced external light to activate or deactivate, wherein the peripheral interfaced external light is the at least one light.

6. The method of claim 1, wherein selectively activating or deactivating further includes activating the at least one light in a custom color based on the determining.

7. A method, comprising:
   changing an original illumination of Light Emitting Diodes (LEDs) situated on a terminal status pole associated with a terminal to a changed illumination when a scanner determines an item code for an item passing in front of at least one window of the scanner is unable to be read; and
   providing the changed illumination on a horizontal surface of the terminal status pole that is visible within a field-of-view of an overhead security camera, wherein the scanner comprises a peripheral connection to the LEDs of the terminal status pole and the scanner controls the LEDs during transactions processed at the terminal and wherein the LEDs when illuminated is not visible to customers from the terminal status pole, wherein the LEDs when illuminated do not interfere with existing lights associated with the terminal status pole and the existing lights are visible to the customers from the terminal status pole.

8. The method of claim 7, wherein changing further includes changing a color of the LEDs to a different color associated with the original illumination.

9. The method of claim 7, wherein changing further includes turning off the LEDs as the changed illumination when the original illumination included the LEDs turned on.

10. The method of claim 7, wherein changing further includes sending a message from the scanner as an instruction to an external peripheral light that is external to the scanner for the external peripheral light to provide the changed illumination for the LEDs.

11. A scanner, comprising:
   a processor;
   a status indicator manager;
   Light Emitting Diodes (LEDs); and
   a terminal status pole comprising the LEDs on a horizontal surface of a top of the terminal status pole;
   wherein the status indicator manager is configured to:

i) execute on the processor, ii) selectively activate and deactivate the LEDs in the horizontal surface of the top of the terminal status pole based on whether an item code for an item is recognized by the scanner, and iii) ensure that the LEDs when selectively activated or deactivated are visible within a field-of-view of an overhead security camera from the horizontal surface of the top of the terminal status pole, wherein the LEDs when illuminated is not visible to customers from the terminal status pole, and wherein the LEDs when illuminated do not interfere with existing lights associated with the terminal status pole and the existing lights are visible to the customers from the terminal status pole;

wherein the scanner further comprises a peripheral connection to the LEDs of the terminal status pole and the processor of the scanner controls the LEDs during transactions processed at a terminal associated with the scanner.

\* \* \* \* \*